(12) United States Patent
Stathis

(10) Patent No.: US 11,807,286 B2
(45) Date of Patent: Nov. 7, 2023

(54) TILER CADDY

(71) Applicant: Shark Toolers, Morris Plains, NJ (US)

(72) Inventor: James Stathis, Morris Plains, NJ (US)

(73) Assignee: Shark Toolers, Morris Plains, NJ (US)

( * ) Notice: Subject to any disclaimer, the term of this patent is extended or adjusted under 35 U.S.C. 154(b) by 0 days.

(21) Appl. No.: 17/843,735

(22) Filed: Jun. 17, 2022

(65) Prior Publication Data
US 2022/0315081 A1 Oct. 6, 2022

Related U.S. Application Data

(63) Continuation-in-part of application No. 17/126,096, filed on Dec. 18, 2020, now abandoned.

(51) Int. Cl.
*B62B 3/00* (2006.01)

(52) U.S. Cl.
CPC .......... *B62B 3/005* (2013.01); *B62B 2202/48* (2013.01); *B62B 2501/065* (2013.01)

(58) Field of Classification Search
CPC ..... B62B 3/005; B62B 2301/044; B25H 3/04; B25H 3/06
See application file for complete search history.

(56) References Cited

U.S. PATENT DOCUMENTS

| | | | | |
|---|---|---|---|---|
| 3,085,521 A | * | 4/1963 | Proctor | A47B 96/067 108/27 |
| 3,358,866 A | * | 12/1967 | Kinney | H02G 3/125 220/3.9 |
| 3,862,351 A | * | 1/1975 | Schindler | H02G 3/126 220/3.9 |
| 4,007,563 A | * | 2/1977 | Nakagawa | E04D 3/3606 52/378 |
| 4,819,800 A | | 4/1989 | Wilson | |
| 4,904,105 A | * | 2/1990 | Myers | E04C 2/428 403/387 |
| 5,346,169 A | * | 9/1994 | Polonsky | A47G 1/20 248/225.11 |
| 6,095,465 A | | 8/2000 | Weck | |
| 6,126,126 A | * | 10/2000 | McKiernan, Jr. | A47G 1/22 248/497 |
| 6,206,334 B1 | * | 3/2001 | Weck | A47G 1/17 248/467 |
| 6,629,680 B2 | * | 10/2003 | Weck | A47G 1/20 248/176.1 |
| 8,448,959 B1 | * | 5/2013 | Pohot | B66F 13/00 280/47.131 |
| 8,672,286 B2 | * | 3/2014 | Darre | A47G 1/164 33/666 |
| 8,950,991 B2 | * | 2/2015 | Trifilio | F16B 5/0208 411/103 |
| 9,010,550 B2 | | 4/2015 | Figueroa | |
| 9,943,956 B1 | | 4/2018 | Giamanco | |
| 10,724,678 B1 | * | 7/2020 | Elliott | F16M 13/02 |

(Continued)

FOREIGN PATENT DOCUMENTS

WO WO 2018/039584 3/2018

*Primary Examiner* — Ko H Chan
(74) *Attorney, Agent, or Firm* — Baldini Law. LLC

(57) ABSTRACT

A simple, versatile tool and accessory caddy, temporarily attachable to a wall, rollable across a floor and securely providing easy access to a tile installer of all needed tile installation tools and accessories.

10 Claims, 13 Drawing Sheets

(56) References Cited

U.S. PATENT DOCUMENTS

| | | | | |
|---|---|---|---|---|
| 2005/0000716 A1* | 1/2005 | Halbert | ............... | H02G 3/20 |
| | | | | 174/50 |
| 2008/0245030 A1* | 10/2008 | Sieber | ............ | E04F 13/0835 |
| | | | | 52/782.1 |
| 2017/0138068 A1* | 5/2017 | Wnukowski | ......... | E04F 21/185 |
| 2018/0064279 A1* | 3/2018 | Hanley | ............... | F16B 2/065 |
| 2020/0325925 A1* | 10/2020 | Cogburn | ............ | F16B 15/0053 |

\* cited by examiner

TILER CADDY

This is a Continuation-in-Part Application claiming priority back to application Ser. No. 17/126,096 filed on Dec. 18, 2020, which in turn was a Continuation-in-Part Application claiming priority back to application Ser. No. 16/778,210 filed on Jan. 31, 2020.

FIELD OF THE INVENTION

A simple, versatile tool and accessory caddy, temporarily attachable to a wall, rollable across a floor, and securely providing easy access to a tile installer of all needed tile installation tools and accessories with a proprietary wall attachment mechanism and housing.

BACKGROUND

The beauty of a tiled floor, tiled shower enclosure, or tiled wall, starts with quality materials and finishes with tight, even, grout joints where lippage—the variation in height of adjoining or neighboring tiles—is minimized or eliminated. A recent trend is the desirability of very large tiles, especially over large surfaces, such as floors or large expansive walls. These larger tiles make it harder to eliminate lippage without the use of a leveling system.

One such leveling system is sold under the brand Vortex®, which requires tilers to install leveling fasteners every ten inches or so across a tiling grid, in all directions. Other brands include, Perfect Level Master™ 'T-Lock', Raimondi RLS™ tile leveling system, Yaekoo™ wedges, and others. Whatever system is used, one of these or some other, invariably, what is universally required is ready access to the various parts, typically, including, clips that get placed under adjoining tiles as the tiles get laid in place, some type of wedge or T or leveler to be used in conjunction with the clips, as well as common tiling tools, including but not limited to spacers, a rubber mallet, a mastic knife, and the like.

The same issues present themselves when tiling an expansive wall, a backsplash, a tub surround, and anywhere it would be convenient to have essentially a toolkit at the ready. However, typical tool chests, tool organizers, or workbenches, even modified smaller versions, are cumbersome to have in the area where active tiling is occurring. Moreover, it must be continually moved as the work progresses.

Tilers also work on all of the aforementioned types of tile installations. For example, a tiler may be working on a floor one week, a tub/shower surround in the next week, and a large wall the following week. It would be beneficial to have one tool organizer capable of adapting to all situations—walls, floors, smaller spaces, etc.

There have been attempts to solve the difficulties noted. For example, in U.S. Pat. No. 4,819,800, titled TOOL STORAGE SYSTEM, disclosed is, "a tool box is formed of two identical shallow halves hinged together to have an open position for use and a closed position for carrying. A set of supports permit the box to be temporarily attached to a wall, such as the rear cab wall of a pickup truck or the like, in the open position providing access to tools held in a plurality of tool holders attached to planar walls of the box halves. The supports include resilient portions for quick release of the box halves. Handles on the tool box permit carrying in the closed position." The temporary attachment of the tool chest here is via relatively permanent hooks. This does not work to solve the issues described.

In another example, U.S. Pat. No. 9,010,550 B2 titled UNDER-HOOD TOOL BAR, discloses, "a tool bar for securing under a hood of a car during repair and maintenance is disclosed. A rigid member spanning a substantial portion of the hood is flexibly secured to hooks. The hooks engage edges of the hood and may include a compliant covering. The hooks may secure to the rigid member by means of straps and the straps may be tensioned by means of tensioners secured to one of the hooks and the rigid member. A stabilizer secures to the rigid member and has an end that may be clipped or otherwise fastened to a portion of the hood to resist rotation of the rigid member. One or more tool retaining members secured to the rigid member, such as a socket rack, magnetic bar, hook groove, or the like." Again, recognized is the need to have tools close and organized, but the solution requires a permanency of attachment points.

In another example, International Patent Application Serial No. PCT/US2017/048654, titled ADHESIVE MOUNTING DEVICES, discloses, "adhesive mounting assemblies that are capable of attaching or adhering to a surface and that can be removed from the surface without causing damage to the surface. In some embodiments, the mounting assemblies are peeled off the surface. The present disclosure generally relates to adhesive articles including a mounting device. The adhesive articles have one or more adhesive areas (which can be part of one continuous adhesive area) exhibiting adhesive properties and one or more non-adhesive areas that lack significant adhesive properties. At least one of the non-adhesive areas is located in an area and/or has a size, shape, and/or geometry that lowers and/or controls at least one of the average peel force and/or the peak peel force of the adhesive article such that the peel force of the adhesive article does not exceed the threshold for causing damage to the surface from which the adhesive article is peeled. In some embodiments, at least one non-adhesive area is adjacent to or aligned with the mounting device on either the same major surface of a backing or on the opposing surface of the backing." Here, separate adhesive hooks would have to be mounted prior to hanging a tool caddy on those hooks and repeated each time the tool caddy was to be moved.

In another example, U.S. Pat. No. 9,943,956 titled, CANVAS TOOL CADDY, discloses, "a canvas tool caddy designed to removably fit over the handle of a rolling tool chest with telescopic handle. The canvas tool caddy is meant to supplement the tool storage of the rolling tool chest. The canvas caddy is removable from the rolling tool chest telescopic handle. The tool caddy optionally has one or more flexible, bendable spines, to bend the flat tool supporting base wall surface substrate into an open planar flat display configuration which retains its shape while supported on the handle of the rolling tool chest. The rolling tool chest's telescopic handles provide upward load forces counteracting downward load forces of the handle, and the equilibrium is spread equally along an internal horizontal spine, to keep the tool caddy open when opened from a close transport state to an open viewable, tool accessible state."

In another example, U.S. Pat. No. 8,448,959 titled, TOOLBOX AND TOOL MOUNT FOR AERIAL WORK PLATFORM, discloses, "A toolbox is configured to hang from an upper rail of a guard rail of an aerial work platform, such as a scissor lift or cherry picker. A rail hanger is attached to a chest to removably hook the chest to the upper rail of the guard rail and removably suspend the chest from the upper rail and above the floor of the platform. A pull handle is attached to a top of the rail hanger. A pair of wheels is coupled to a bottom and the back of the chest. The toolbox has a height extending a majority of a height of the guard rail with the pair of wheels suspended above a floor of the platform when the chest is suspended from the upper rail. The toolbox can include a wire dispenser."

In another example, U.S. Pat. No. 6,095,465 titled STRUCTURE FOR AND METHOD OF MOUNTING AN OBJECT ON A VERTICAL SURFACE AND A LAMINATED BACKING FOR SUCH A STRUCTURE, discloses, "A picture hanger is initially held in place on a wall in a temporary manner without damaging the wall by including a backing with a shock absorbing layer overlaid by a temporary adhesive film. Prior to the picture hanger being temporarily fastened to the wall, the temporary adhesive film is covered by a protective paper sheet. The shock absorbing layer prevents the wall from being indented when the hanger is permanently secured to the wall by hammering a pin or nail through the layer and film. The layer is sufficiently soft to hold the nail in place when the nail impales the layer prior to hammering the nail into the wall. Prior to the backing being secured to the hanger, the permanent adhesive film is overlaid by another removable protective sheet. Initially the backings are located on an elongated strip and are punched from the strip for mounting on the hook body."

In another example, U.S. Pat. No. 10,724,678 titled FAST FIT BRACKET ASSEMBLY, discloses, "a bracket assembly" includes a die struck metal plate, a molded plastic guide/nail set configured to fit over the die struck metal plate, the molded plastic guide/nail set including three spaced apart apertures, each of the apertures configured at an angle with respect to a central surface of the guide/nail set, the central surface comprising two upper opposing wings and a lower central wing configured to receive and secure an accessory, and common finish nails, the common finish nails used to secure the die struck metal plate and the molded plastic guide/nail set, when joined together, to a vertical surface.

In another example, U.S. Pat. No. 8,950,991 titled, SCREW CAPTIVATOR, discloses, "a device for captivating a variety of fasteners relative to a first member. A captivator includes a body adapted to be secured to the first member and a retainer received within the body and having a surface engaging a captured fastener. Together the body and retainer maintain the captivated fastener in place relative to the first member. Keyway surfaces are provided upon the body or retainer or both and an external or internal key engages the keyway surfaces to selectively lock the body and retainer together, such as during installation or replacement of the captured fastener. Upon removal of the key, the retainer is free to rotate and translate relative to the body."

None of the foregoing references, alone or in combination, teach the salient and proprietary features or construction of the present disclosure, and as such, fail to be useful as a single tiler's tool caddy, rollable across a floor and temporarily attachable and moveable along a wall with a proprietary wall mounting user accessible safety screw system, to follow in front of a tiler's progress keeping all necessary and desirable tools and accessories at the ready.

The present disclosure teaches several embodiments that provide a portable, lightweight, utility storage device, capable of organizing and storing for immediate use, hand tools, tile spacers, cellphone, keys, pencil, markers, utility knife, rubber mallet, and the like, wherein the entire storage device is capable of rolling across a floor or mounting temporarily to drywall, cement board or Hardiebacker®, moveable with ease irrespective of the surface along which it is moveable, and supported in various orientations quickly and easily.

SUMMARY

The present disclosure teaches a device with embodiments that provide a plurality of shelves and/or bins, mounted on wheels, configured to be immoveable and stationary when desired, and easily moveable to a next area when desired, whether that is across a floor or mounted to a wall, i.e., configured with both wheels for rolling and a proprietary configuration of nail-like/screw fasteners—hidden until desired to be implemented by a user—to easily mount (and unmount) to a wall, again configured to be immoveable and stationary when desired, and easily moveable to a next area when desired.

In one embodiment, the plurality of shelves and/or bins are constructed from lightweight but sturdy plastic, so as to be light but durable and easily portable when loaded with supplies.

In one embodiment, the entire device is configured to be assembled, disassembled and reassembled when desired.

In one embodiment, the device can be configured with anti-tip braces to prevent spill-overs.

In one embodiment, the device may have any number of shelves and or compartments and/or bins incorporated into the design for any number of tools and/or supplies.

In one embodiment, the edges or outer sidewalls of the device may also be configured to hold tools, supplies, or other implements, such as a cellphone, and may be configured with pouches, hooks, magnets, hook and loop type materials, or other known means for attaching items.

In one embodiment, the edges of the device may be configured with a laser level to assist a tiler in keeping a straight and level line across a certain tile grid configuration.

In one embodiment, the back wall of the device is configured with a plurality of nail-like/screw fasteners, that are configured in a proprietary arrangement and in a proprietary housing, to allow the user to orient the device on a wall however they want. In a preferred embodiment, two such nail-like/screw fasteners are oriented in a general downward general direction at or near the upper part of the device, spaced apart, and through the backwall such that when implemented, the sharp end protrudes out from the back wall and capable of penetrating a surface, but the access end is accessible by a user on the interior of the backwall through a concealed access port of the housing, and then one or more such nail-like/screw fasteners are oriented in a slightly downward direction but is angled downward, and either left or right, such that, when placed against a wall, will hold the device in whatever clockwise rotational orientation the user desires. In one embodiment, there could be just one such lower nail-like/screw fastener, also oriented in a general downward direction, but also either left or right, to prevent rotation of the device, and below the above noted nail-like/screw fasteners at or near the upper part of the device. In this embodiment, the user would essentially hang the device using the top two nail-like/screw fasteners at the desired location, and then move and orient the bottom fastener in an orientation to secure the device from any rotational movement and insert. The nail-like/screw fasteners in this embodiment are fastened through the back wall of the device, but are hidden from view and access until the user moves an access port cover on the housing bracket to reveal the access port and then activate the spring loaded nail-like/screw fastener with a simple quarter-turn screw action (in a screw embodiment), or push downward (in a nail-like embodiment).

In an alternative embodiment, the nail-like/screw fasteners can have a screw function, having threads and be rotatable in their bracket to essentially screw them into the wall at the appropriate point. In a preferred embodiment, the threads are fairly wide to accomplish a quarter turn securing function. In other embodiments, the nail-like/screw fasteners could have any number of threads to adjust the securing function with any number of turns required.

As described above, the nail-like/screw fasteners allow the device to be temporarily but securely attached to a wall that is being worked on, made of drywall or other subsurface that is to be covered. The nail-like/screw fasteners will grip the wall, penetrating it no more than ½" to only temporarily support the entire device on the wall in a desired orientation on an unfinished area, and making it easily liftable and moveable to a next area when desired. In one embodiment, the nail-like/screw fasteners are sharp and stable in the back wall of the device to be supportive and capable of easily penetrating drywall, cementboard, and most surfaces for tiling. In one embodiment, the nail-like/screw fasteners penetrate to a maximum of ½" outside the back surface of the back wall of the device, and therefore will not disturb any plumbing, electric or other structural system behind the wall. On the opposite inner side, the nail-like/screw fasteners have a corresponding screw head or nail head to facilitate screwing or pushing the fastener into the wall surface where necessary. In one embodiment, the nail-like/screw fasteners have a spring mechanism within a housing to keep the fastener within the housing when not in use to prevent the sharp end from protruding out past the end of the surface of the backwall to prevent hurting a user or bystander, and on the interior, the access port is covered by an access port cover that easily rotates to expose the access port as desired, but keeps the access port covered to prevent accidental activation of the fasteners and to prevent the access port from having dirt or wall adhesive from accidentally seizing the fasteners in place. Because the nail-like/screw fasteners generally orient downwards, the device will 'sit down' onto and into the wall wherever the user places it and activates a fastener. Because the nail-like/screw fasteners do not each orient in exactly the same direction as their corresponding counterparts, the device may be mounted slightly tilted in any direction, left or right, and still have one fastener orienting generally downward to temporarily provide the support necessary for stability, and yet allow the user to orient the device in a position most convenient to them in a given situation, and prevent the device from accidental rotation. As noted above, in one embodiment, the nail-like/screw fasteners could also have a screw function to assist the user in inserting the nail-like/screw fasteners into the wall. In this embodiment, the nail head will actually have a screw head and will have a rotatable operation to allow the user to twist the nail-like/screw fasteners into place. In a preferred embodiment, this screw function will only require a quarter-turn to make it quick and easy. In one embodiment, the edges of the nail-like/screw fastener head may have some sort of friction assistance for gripping, such as ridges.

In one embodiment, the nail-like/screw fasteners are mounted through the backwall via a nail-like/screw fastener housing (14) containing a spring load mechanism. In this embodiment, the nail-like/screw fasteners do not protrude through the backwall until the user desires them to and pushes them (in a nail embodiment) or turns them (in a screw embodiment).

In one embodiment, the nail-like/screw fasteners are replaceable. If one should become damaged, bent, blunted, stripped or otherwise unusable or unsuitable for the purpose described, because they are mounted through a mounting bracket housing, a user could remove the damaged nail-like/screw fastener and replace with a brand new one. In addition, one could change from a nail-like/screw fastener used as a nail to one used more like a screw, if desired.

In one embodiment, the nail-like/screw fasteners are made of stainless steel to prevent rusting and promote reuse.

In one embodiment, when used as a rolling caddy, the castors provide sufficient height between the underside of the bottom most shelf and the surface of the floor, so that there is sufficient clearance for the entire device to roll without hitting and fasteners or clips that have already been put in place.

In one embodiment, the device is configured to provide two to three shelves of staggered depth for easy reaching, one or more of the shelves configured with mini bins to contain all components of popular leveling systems in an organized, easy-to-reach manner.

In one embodiment, the castors are configured to be mounted on a spring load system such that minimal force is required to lift the device free to begin rolling, and when that force removed, the device sets down on to legs that stabilize and immobilize the device into place.

In one embodiment, the device is configured to have an underside mount that can be set on any standard tripod allowing the device to be set into an infinite number of orientations and heights, limited only by the capability of the tripod.

DETAILED DESCRIPTION

Figure 1:
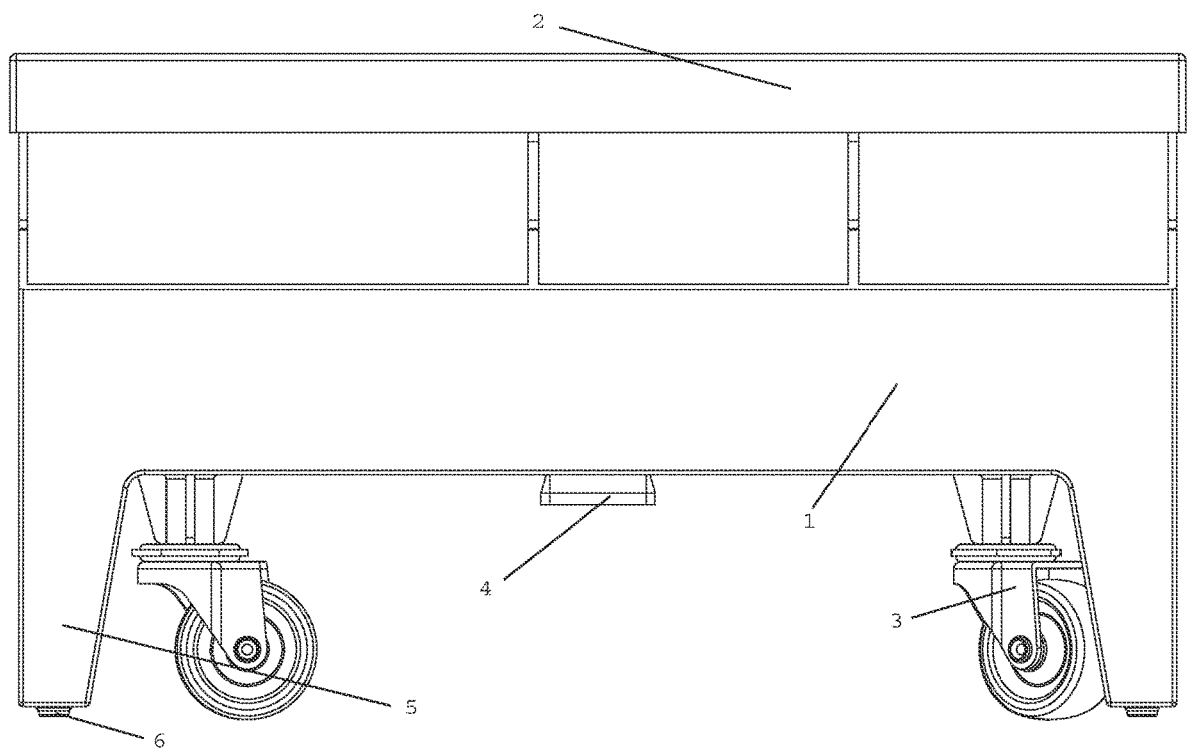
FIG. 1 depicts a front view of one embodiment of the tiler caddy device as described, with a view from the front, showing a basic lower shelf, an upper shelf, the device also comprising castors, a center tripod mount, legs with a bottom stabilizer.
Figure 2:
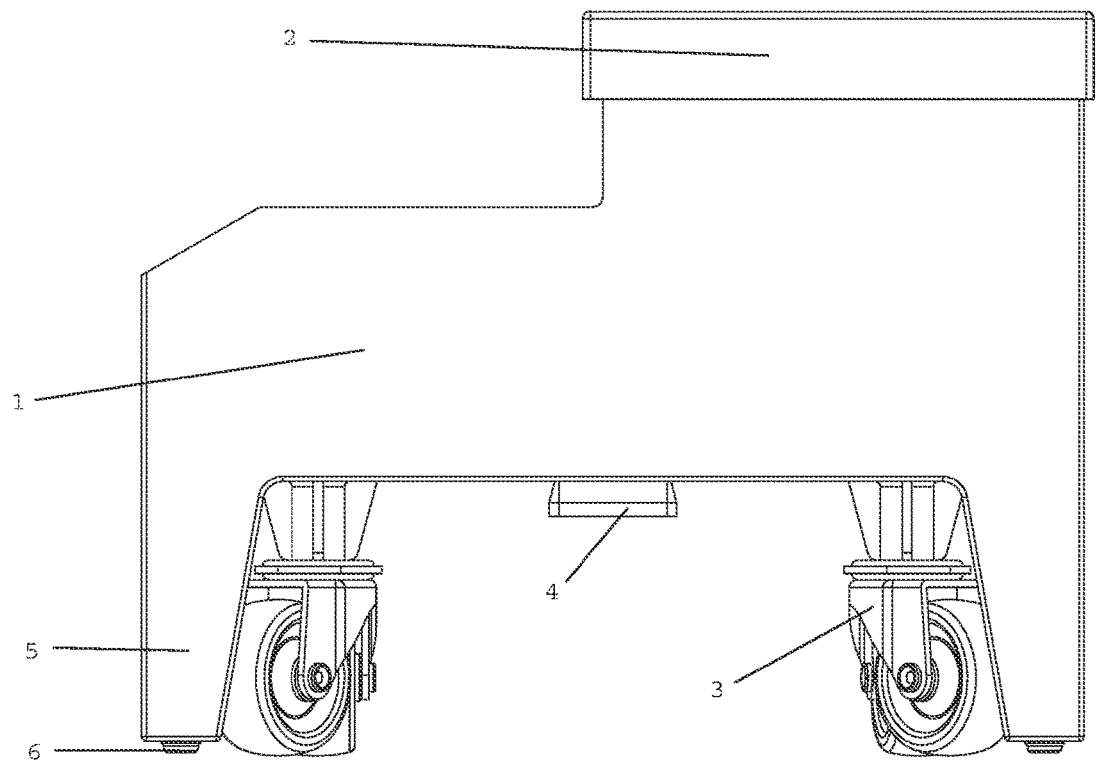
FIG. 2 depicts a side view of one embodiment of the tiler caddy device as described, with a view from one side, showing a basic lower shelf, an upper shelf with a setback, the device also comprising castors, a center tripod mount, legs with a bottom stabilizer.
Figure 3:
FIG. 3 depicts a view from the top looking down of one embodiment of the tiler caddy device as described, showing a basic lower shelf , an upper shelf, and one configuration of dividers.

For clarity of disclosure, and not by way of limitation, the detailed description of the invention is divided into the following subsections that describe or illustrate certain features, embodiments or applications of the present invention.
Definitions "basic lower shelf" as used herein means a main support platform the underside of which may contain legs, castors or other support means, the topside of which may contain bins, dividers, sidewalls, and/or other organizing means, and the topside further comprising support for one or more upper shelves and a back wall.

"upper shelf" as used herein means any additional support platform configured to be supported by the basic lower shelf which may contain bins, dividers, sidewalls, and/or other organizing means.

"castors" as used herein means rolling members attached to a fixed or rotatable support configured to support at least a portion of the underside of a basic lower shelf.

"legs" as used herein means rigid members attached to a fixed support configured to support at least a portion of the underside of a basic lower shelf "nail-like/screw fastener" as used herein means any elongated shard or spike with a sharp end at one end and a surface at its opposite end that may be smooth or flat configured to allow a user to apply a force with a hammer or push or pull the object, or turn in a screw-like manner, to insert (or remove) the first sharp end in or out of a wall. As used herein, nail-like/screw fastener also includes an elongated shard or spike with threads of any gauge, thickness or spacing to provide a screw like function and wherein the fastener can turn or rotate to enable such functionality.

"back wall" as used herein means a connecting surface that connects a basic lower shelf to any number of upper shelves, has an inner surface from which extend the basic lower shelf and the any number of upper shelves, and an outer surface, and may be configured to mount a plurality of nail-like/screw fasteners for mounting the entire device to a surface wall, the sharp end of the nail-like/screw fasteners extending from the outer surface and the smooth or flat end extending from the inner surface.

The System and Method of the Present Invention

A typical tiler caddy device as described herein comprises a basic lower shelf supported by castors further comprising a spring mount, and further supported by a plurality of legs, further comprising a back wall, an at least one upper shelf, and a plurality of nail-like/screw fasteners.

In one embodiment, the tiler caddy device may be constructed without legs (5) and/or castors (3) for use solely as a wall mounted device.

In one embodiment, the tiler caddy device may contain any number of shelf inserts or dividers (7) to provide desired organizational compartments.

In one embodiment, the back wall (9) may further comprise holes configured to contain hooks or other tool mounting capability means.

In one embodiment, a light may be configured to be mounted underneath one shelf.

In one embodiment, an electrical socket may be configured to be mounted on an outside wall, configured to received electrical current and in turn deliver that electrical current as desired.

In one embodiment, a drawer may be mounted to the back wall or underneath an upper shelf of the basic lower shelf.

In one embodiment, a center tripod mount (4) may be constructed in the center of the underneath of the basic lower shelf (1) configured to mount the entire device onto a tripod.

In one embodiment, the main components such as the shelves (upper (2) and lower (1)), sidewalls, backwall (9), etc., are all made from lightweight, durable hard plastic.

Figure 4:
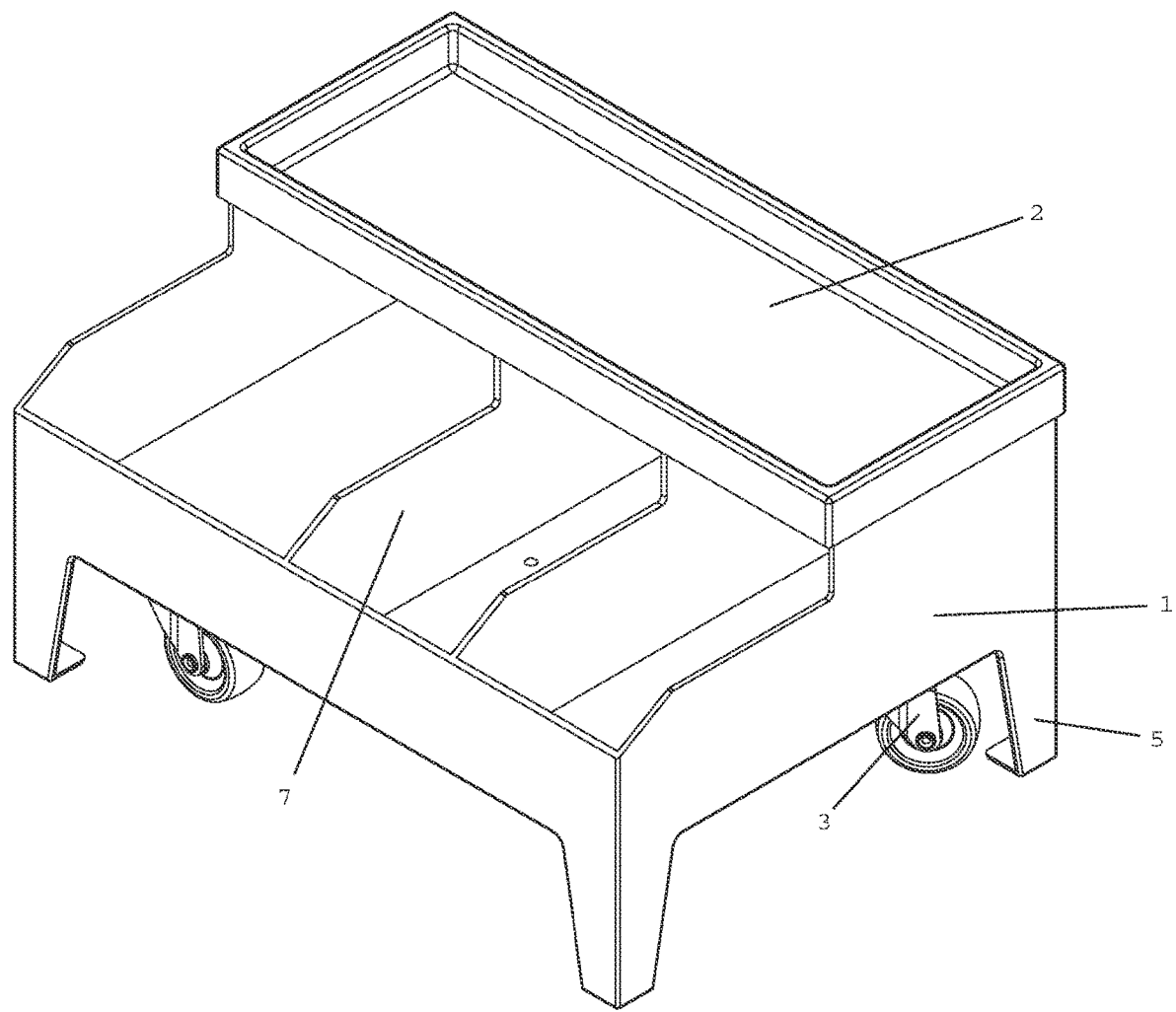
FIG. 4 depicts a perspective view of one embodiment of the tiler caddy device as described, showing a basic lower shelf, an upper shelf with a setback, the device also comprising castors, legs, and one configuration of dividers.
Figure 5:
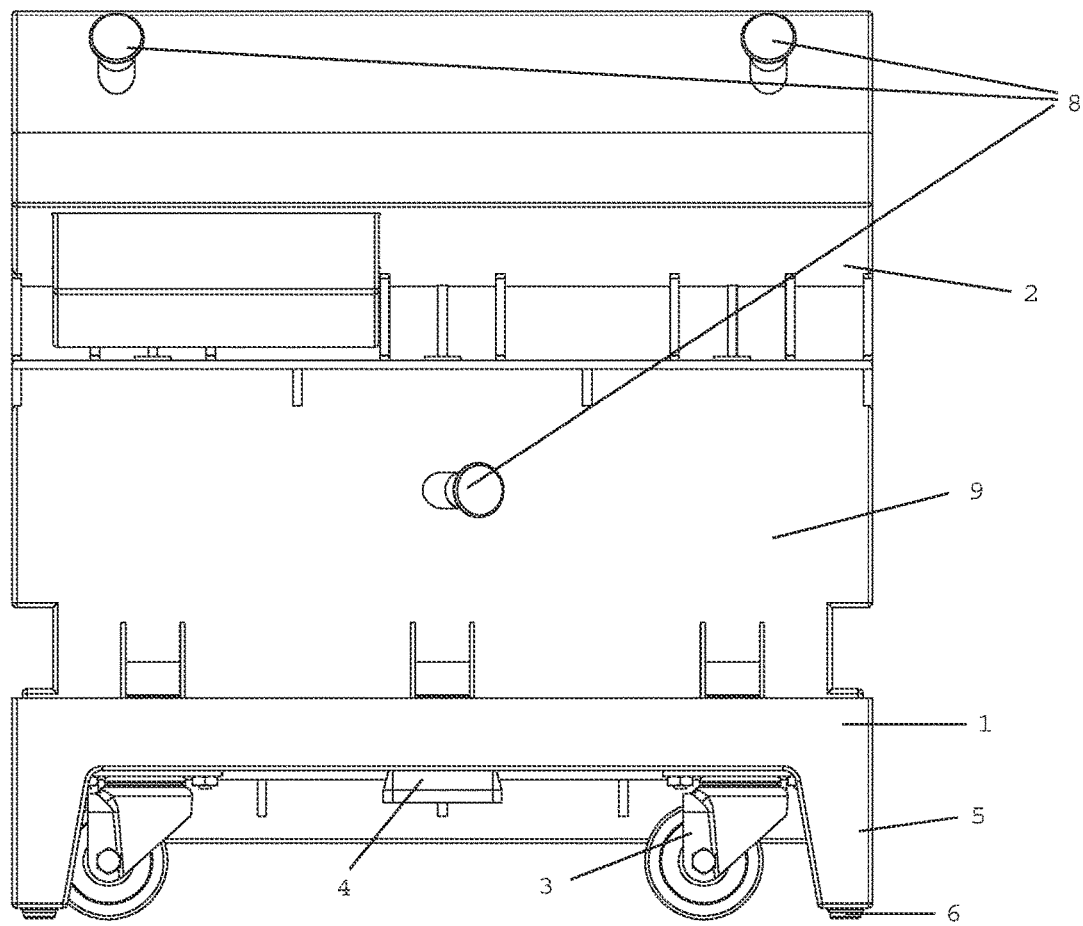
FIG. 5 depicts a view of the inside of the rear wall of one embodiment of the tiler caddy device as described, showing the back wall, showing a basic lower shelf, a cut-a-way view of an upper shelf, the device also comprising castors, a center tripod mount, legs with a bottom stabilizer, and one configuration of a plurality of nail-like/screw fasteners (housing not shown).

Referring to FIG. 4, in one embodiment, the device of the present disclosure appears to be a standard tool caddy, a system of shelves and compartments that can set next to a user to provide easy access to tools and supplies. It may contain shelves (1, 2), compartments with dividers (7) for organization and it may sit firmly on a floor or other surface via its legs (5) and bottom supports (6), or it may wheel around via its wheels on castors (3). However, referring to FIG. 5, in one embodiment, the device of present disclosure may also be temporarily and securely attached to a wall in progress via nail-like/screw fasteners (8) that are mounted through the back wall (9) in a manner such that they can function as described above.

Figure 6:
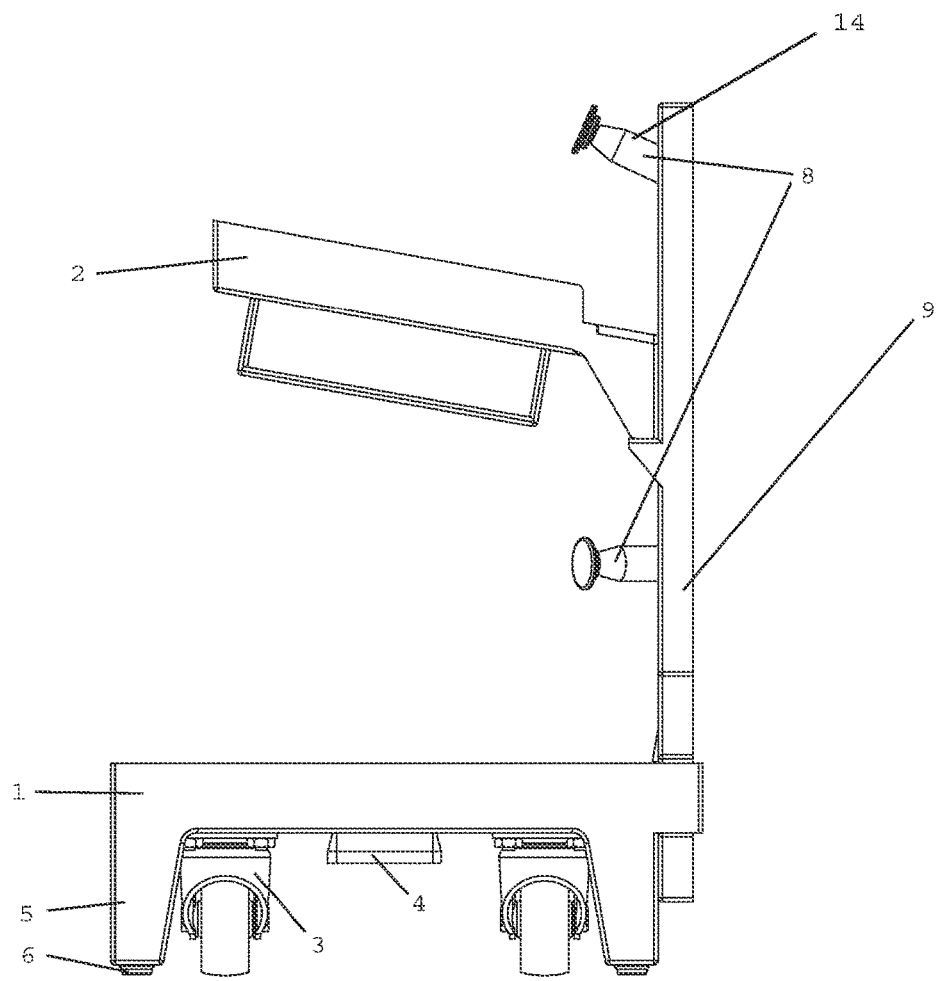
FIG. 6 depicts a side view of one embodiment of the tiler caddy device as described, with a cut-a-way view of some components to emphasize one embodiment of the nail-like/screw fasteners and one upper such fastener generally downward and one lower such fastener generally downward and also angled with the point end to the left, showing the back wall, showing a basic lower shelf, an upper shelf, the device also comprising castors, a center tripod mount, legs with a bottom stabilizer, and a plurality of nail-like/screw fasteners.
Figure 7:
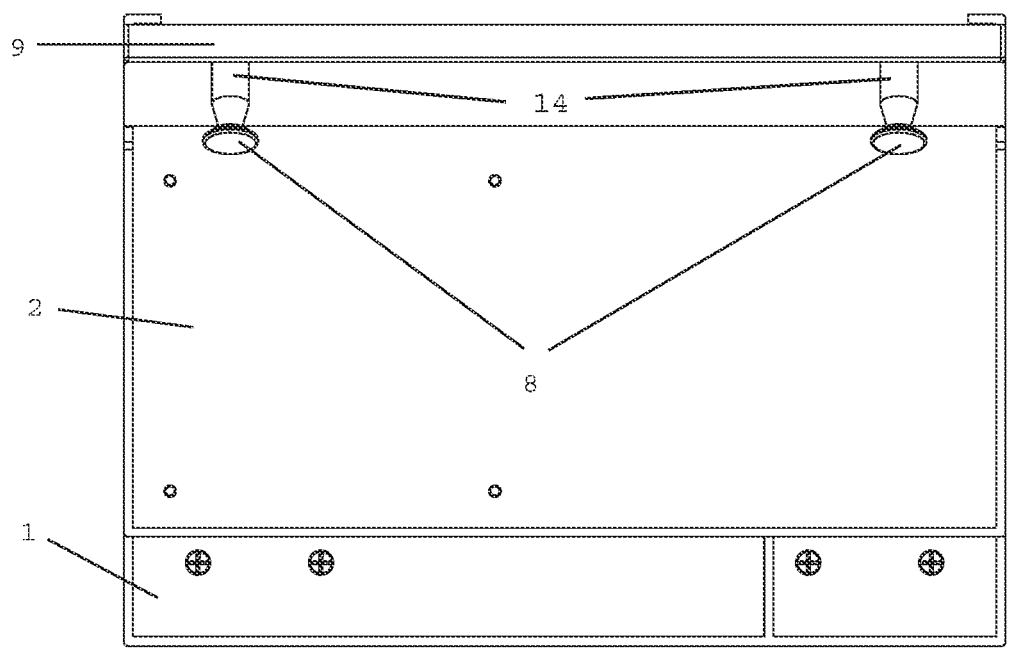
FIG. 7 depicts a top view looking down of one embodiment of the tiler caddy device as described, showing the back wall, showing a basic lower shelf, an upper shelf, the device also comprising a plurality of nail-like/screw fasteners, in this embodiment, showing only two upper nail-like/screw fasteners generally oriented downward (a lower such fastener not shown, being hidden below the upper shelf).
Figure 8:
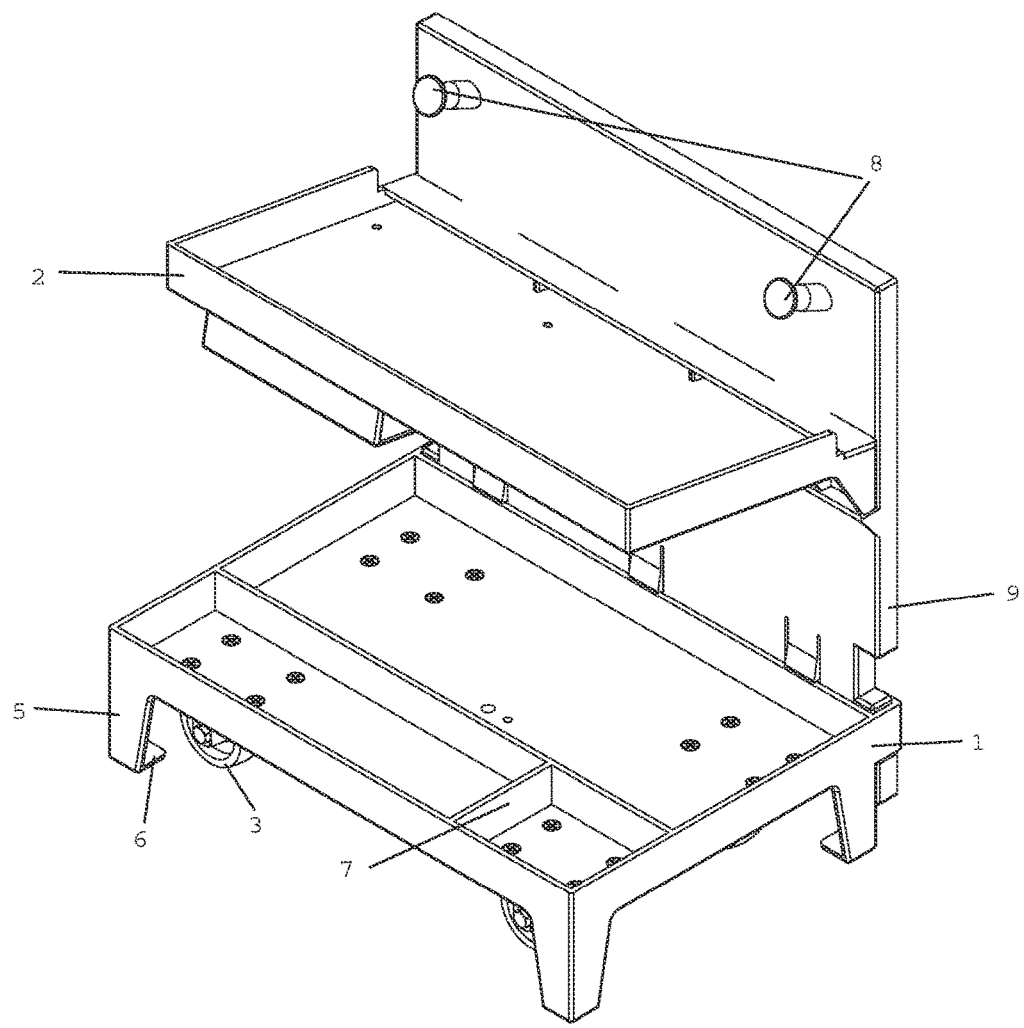
FIG. 8 depicts a perspective view of one embodiment of the tiler caddy device as described, showing the back wall, showing a basic lower shelf, an upper shelf, the device also comprising castors, a center tripod mount, legs with a bottom stabilizer, and a plurality of nail-like/screw fasteners, in this embodiment, showing only two top nail-like/screw fasteners generally oriented downward (a lower such fastener not shown, being hidden below the upper shelf), and one configuration of dividers.
Figure 9:
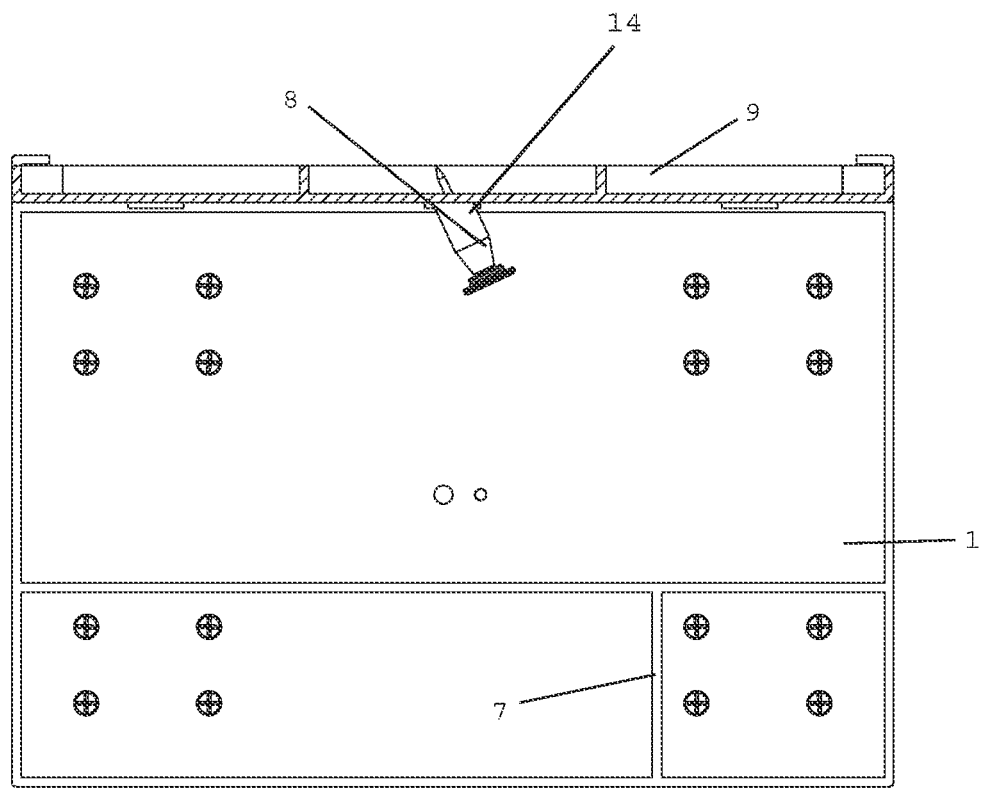
FIG. 9 depicts a cut-a-way top view looking downward of one embodiment of the tiler caddy device as described, with the second upper shelf removed, looking down onto a basic lower shelf, showing a back wall, and, in this configuration, one of a plurality of nail-like/screw fasteners oriented to the left (other upper such fasteners not shown to emphasize the lower such fastener), and one configuration of dividers.

Referring to FIG. 6, in one embodiment, the upper most nail-like/screw fasteners (8) orient in a generally downward direction such that they can support the device on a wall, gripping the wall somewhat like the nails of a picture hook. However, here, in one embodiment, there is a proprietary arrangement such that there may be two such fasteners at the top in a general downward direction for overall support, but at least one other such fastener at an underneath position and oriented in a left or right downward manner, that prevents any rotational torque and slippage of the device in its temporary location. This is also more clearly depicted in FIG. 9 where it is clear that the underneath nail-like/screw fastener (8) is oriented such that it penetrates more left. Nevertheless, the nail-like/screw fasteners are moveable within a bracket mounting (14) them through the backwall such that the user can manipulate the nail-like/screw fasteners into any desired orientation when pushing/screwing them into the wall.

Figure 10:
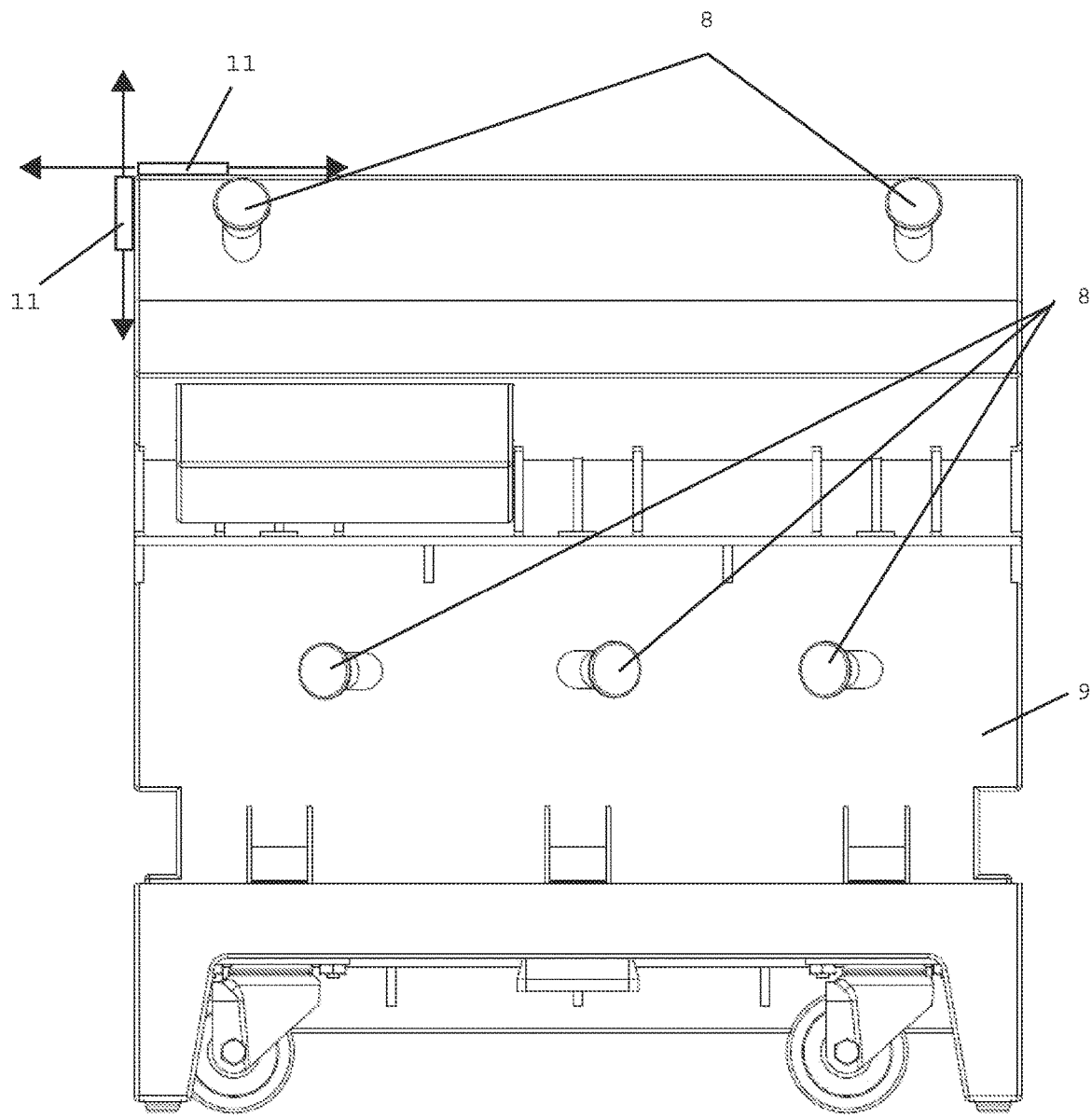
FIG. 10 depicts a cut-a-way view of the interior of the back wall of one embodiment of the tiler caddy device as described, showing the back wall and depicting an alternate arrangement on nail-like/screw fasteners, in this configuration, two such nail-like/screw fasteners generally orienting downward positioned along the top of the device, and three such nail-like/screw fasteners generally orienting in various left and right directions vis a vis each other, below the upper shelf. Also shown in this view is one embodiment of laser levels being mounted on the back wall of the device, one in a horizontal and one in a vertical mount.
Figure 11:
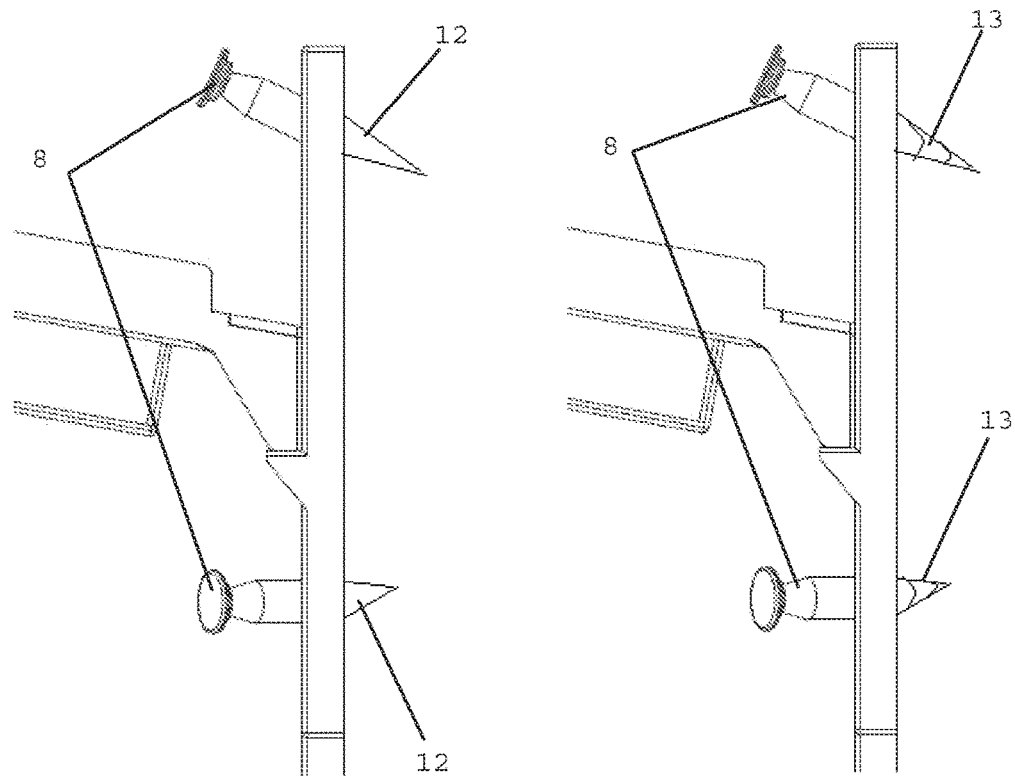
FIG. 11 depicts two alternative embodiments of nail-like/screw fasteners, one with smooth nail points and the other with screw-like points and further depicting that they can achieve various angles of penetration through the back wall.

Referring to FIG. 10, in one embodiment, there could be a plurality of underneath nail-like/screw fasteners (8), each moveable in its bracket housing (14) through the back wall (9) so that the user may orient the direction of any one of them to penetrate in any desired direction. Referring to FIG. 10, the nail-like/screw fasteners (8) may have smooth, sharp, penetrating nail ends (12) that simply push into place, or the ends could contain threads and be more screw-like (13) such that they rotate into place much like a screw by turning (and come out by counter-rotation). In one embodiment, in the screw function embodiment, the turn could be anywhere from quarter turn through a couple full revolutions.

Figure 12:
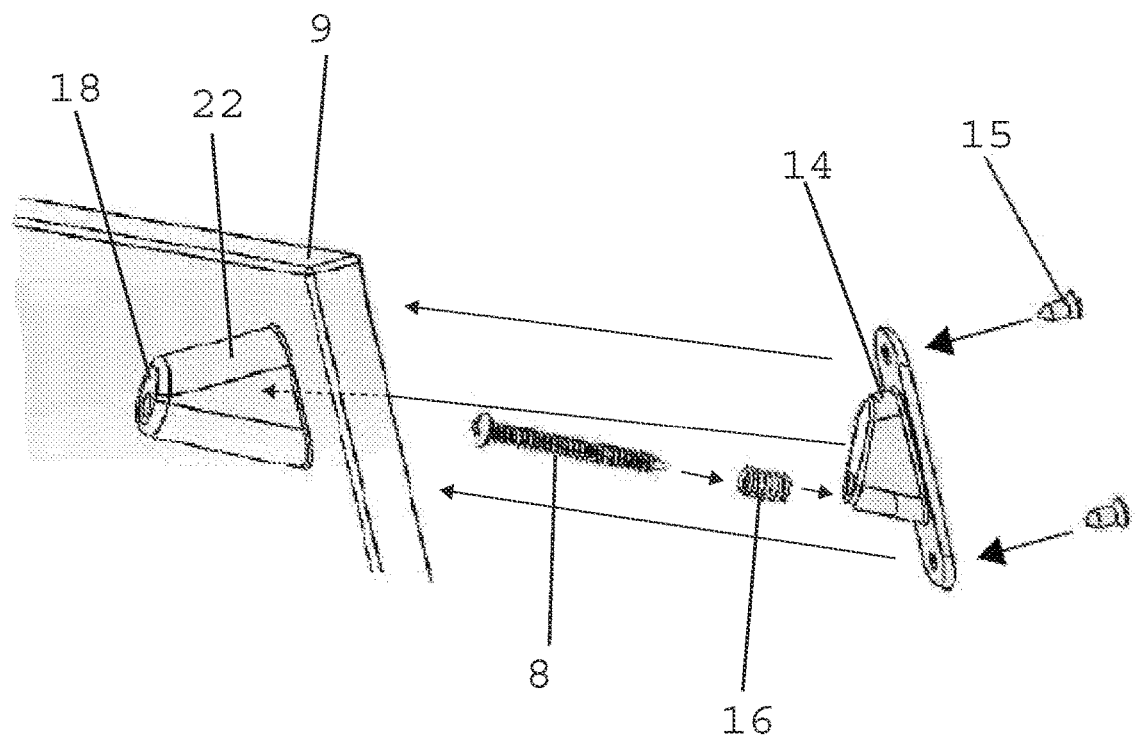
FIG. 12 depicts a flow diagram illustrating how the housing is attached through the backwall and into a shroud attached to the housing on the back wall via housing attachment screws and the naillike/screw fastener is loaded into the housing through a housing guide port with a spring load mechanism and then covered with the nail-like/screw fastener cover on the shroud.
Figure 13:
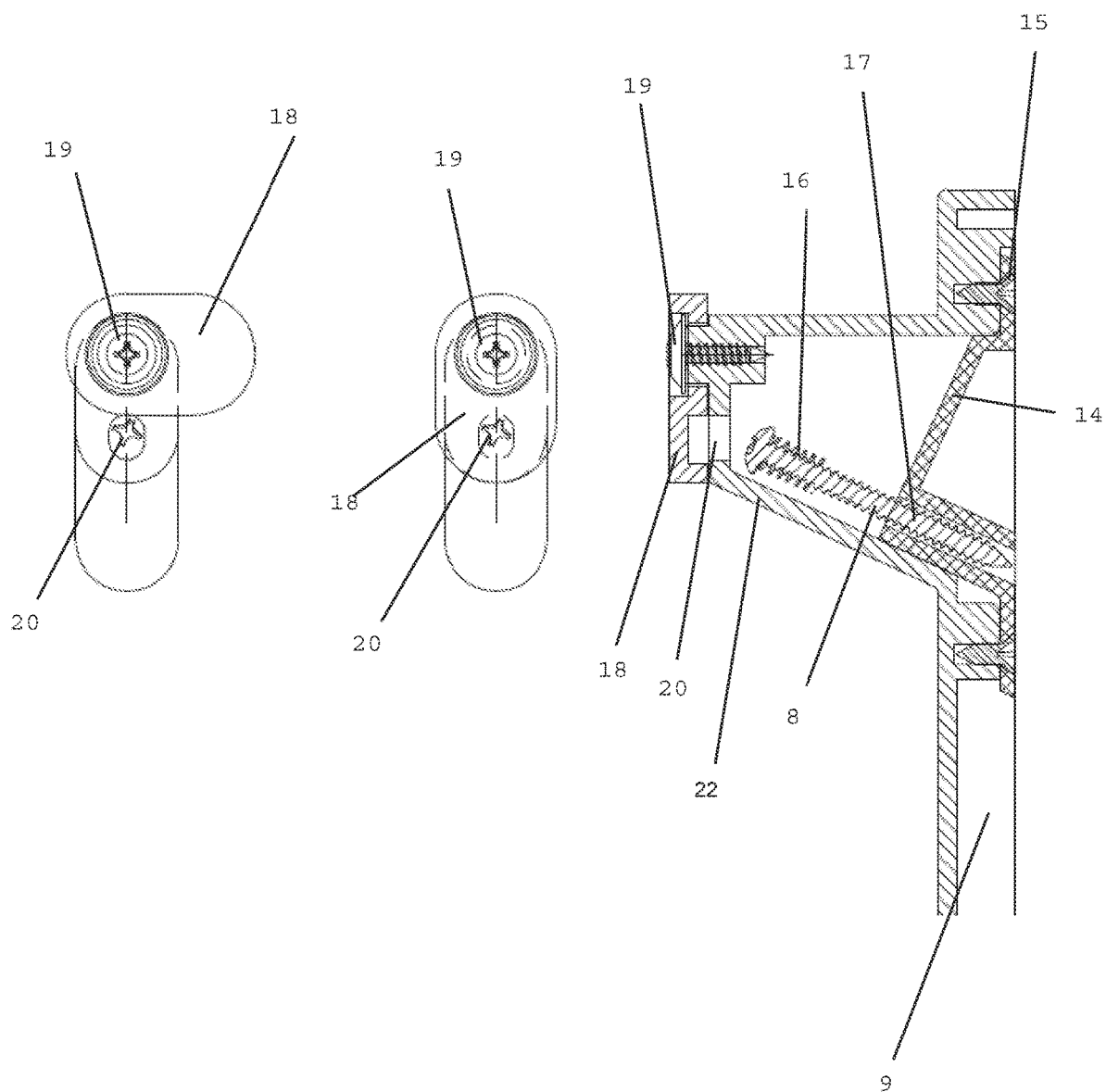
FIG. 13 depicts an embodiment of a nail-like/screw proprietary housing that attaches through the back wall and into a shroud via housing attachment screws, the nail-like/screw fastener housed inside with a spring load mechanism keeping the fastener from premature deployment through its guide port, and the shroud further comprising a cover secured to the shroud via a housing cover screw and a close-up of the cover in an open and closed position that when open reveals a through port providing access to the fastener.

Referring to FIG.s 12 and 13, the nail-like/screw fasteners (8) could be positioned through the back wall (9) of the device in a proprietary housing (14) and shroud (22) combination that contains a guide port (17) pre-defining the orientation of the fastener through the back wall. These FIG.s illustrate a detailed look at the proprietary housing (14) that is attached through a backwall housing into a shroud (22) and attached to the backwall (9) vie housing attachment screws (15). The nail-like/screw fastener (8) is then mounted through the housing (14) through the guide port (17) with a spring load mechanism (16) to insure that the fastener is not prematurely deployed or capable of personal injury when not deployed. Moreover, as shown in FIG. 12, in one embodiment, the shroud (22) further comprises a housing cover (18) attached to the shroud (22) via a housing cover screw (19) that allows the cover to rotate open and closed and cover or expose the fastener exposure port (20) that allows the user access to the fastener in an open position, or covers the access port during use or storage to prevent unwanted, accidental deployment, or debris, dirt or grime from entering into the access port and interfering with the smooth deployment of the fastener.

EXAMPLES

The present invention is further illustrated, but not limited by, the following examples.

A typical use of a tiler caddy device as described herein is by a tile installer actively installing tile either on a floor or on a wall or both. In this example, the tile installer will require the tile to be installed, mastic for adhering the tile to the to be tiled surface, tools for spreading the tile mastic, tile spacers, and tools for insuring the tile is adhered level and level with respect to each other, as well as square and true. Such additional tools may require commercial leveling supplies as described above, a rubber mallet, a level, a pencil, a tile cutter, among other things. Additionally, the tile installer may want to have things such as a cell phone or other convenience items. To have all of these things at the ready, and capable of moving along with the tiler as they progress through the installation, the tile installer would first load all of the foregoing supplies into the various compartments of the tiler caddy device. Besides the tile itself and the mastic, the tile installer would then have every installation tool and convenience item in one organized place.

The tile installer would then roll the tile caddy device alongside themself as they progress along a floor installation and be able to directly move up a wall installation by then lifting the device and inserting the nail-like/screw fasteners into an unfinished area of the wall. As progress is made, the device can be easily repositioned by simply lifting it off the wall and replacing the fasteners in a new unfinished area.

Thus, the tile caddy device as described herein will have all of the tile installer's supplies at the ready through any tile installation setting and can follow the tile installer through any installation and adapt to any installation setting along the way without any need to transfer supplies to separately adapted supply caddies.

The forgoing allows the tile installer to work fully hands-free, pocket-free, and pouch-free, with his or her tools and parts always within easy reach for greater comfort, efficiency and safety.

Publications cited throughout this document are hereby incorporated by reference in their entirety. Although the various aspects of the invention have been illustrated above by reference to examples and preferred embodiments, it will be appreciated that the scope of the invention is defined not by the foregoing description but by the following claims properly construed under principles of patent law.

Each and every feature described herein, and each and every combination of two or more of such features, is included within the scope of the present invention provided that the features included in such a combination are not mutually exclusive.

What is claimed is:

1. A device comprising:
   a lower shelf comprising a lower shelf underside and a lower shelf topside, the lower shelf underside configured to have mounted at least one support means and the lower shelf topside having at least outer sidewalls configured to contain items, and attached to a backwall;
   an at least one upper shelf comprising an upper shelf underside and an upper shelf topside, the rear of the upper shelf configured to mount to said backwall over the lower shelf topside, and the upper shelf topside having at least outer side walls configured to contain items, and attached to the same backwall at a position above the lower shelf;
   a plurality of attached, supporting but moveable nail-like/screw fasteners housed in a housing of a separate housing bracket through the backwall, each such nail-like/screw fastener housed in the separate housing bracket such that a sharp end on each such nail-like/screw fastener is deployable to protrude at most approximately ½" past an outer outward facing surface of the backwall, said each such housing being attached through said backwall and attached to said backwall with housing attachment screws and deployed into a covering shroud on the backwall, and each said housing configured to contain one nail-like/screw fastener in a housing guide port with a spring load mechanism and each and covering shroud further comprise a housing cover attached to said shroud configured to open and close and when open expose a deployment port allowing a user access to the nail-like/screw fastener.

2. The device of claim 1, further comprising a plurality of castors.

3. The device of claim 2, wherein the castors are mounted with a spring attachment.

4. The device of claim 1, further comprising a plurality of legs.

5. The device of claim 1 wherein said one lower shelf and said at least one upper shelf are made from lightweight, durable, hard plastic.

6. The device of claim 1 wherein there are two nail-like/screw fasteners positioned above the upper shelf topside and generally oriented downward.

7. The device of claim 6 wherein there is one nail-like/screw fastener positioned below the upper shelf underside and generally oriented downward and to either the left or right.

8. The device of claim 7 wherein all of the nail-like/screw fasteners are housed in housing brackets wherein each said housing's guide port guides each said nail-like/screw fastener in a generally downward direction with at least one such housing also guiding a nail-like/screw fastener in a left or right direction.

9. The device of claim 7 wherein all of the nail-like/screw fasteners contain screw threads to provide a screw like functionality that is deployable with a one quarter turn.

10. The device of claim 1 wherein said device further comprises a first level mounted to a top portion of the backwall and a second level mounted to a side portion of the backwall.

* * * * *